W. A. HILL.
POWDER MEASURING APPARATUS.
APPLICATION FILED DEC. 12, 1907. RENEWED APR. 10, 1914.

1,185,505.

Patented May 30, 1916.
4 SHEETS—SHEET 2.

Witnesses:
A. C. Ratigan
J. F. Richardson

Inventor:
Wifford A. Hill
by Wright Brown Quinby May
Attorneys.

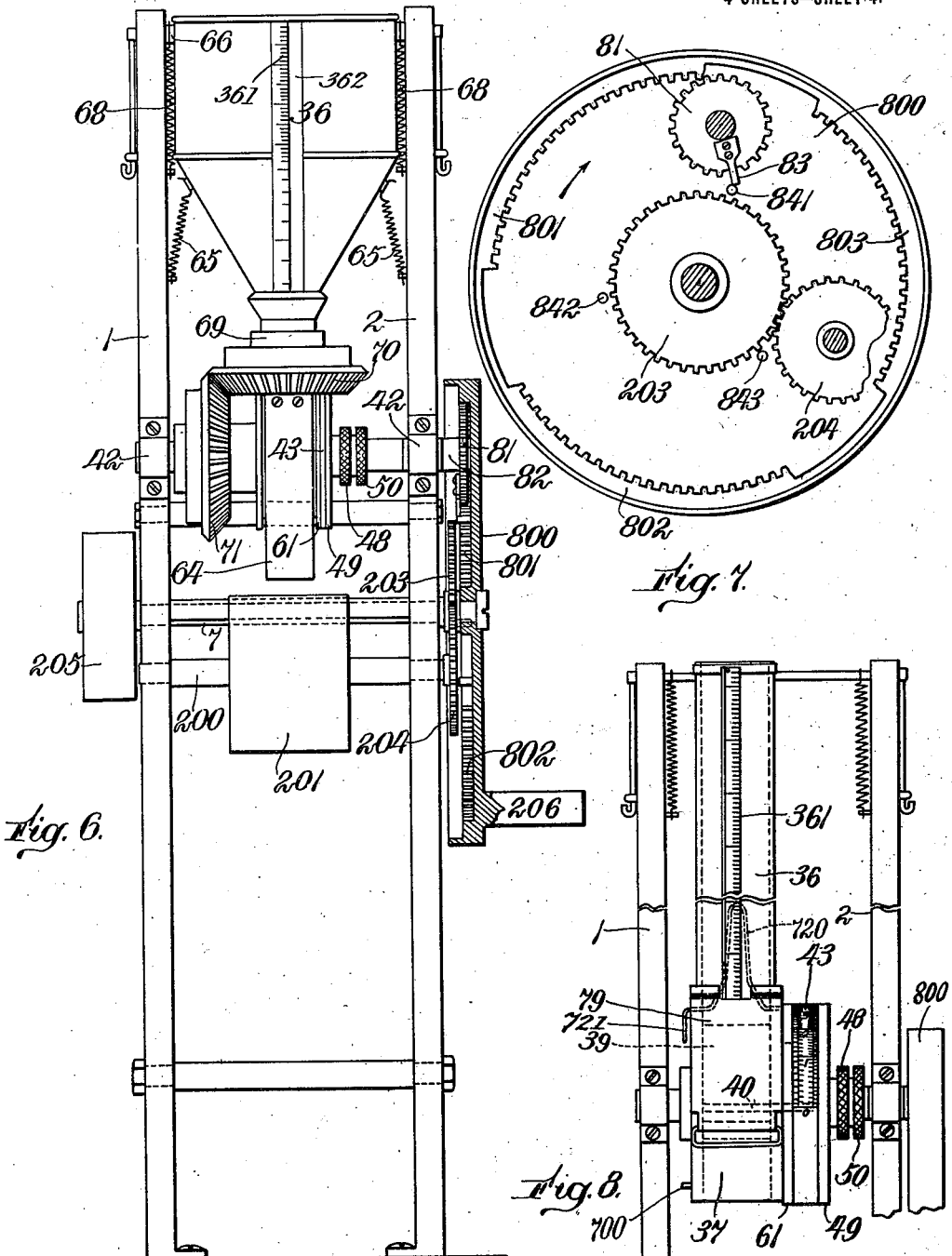

UNITED STATES PATENT OFFICE.

WILFORD A. HILL, OF WALTHAM, MASSACHUSETTS, ASSIGNOR, BY DIRECT AND MESNE ASSIGNMENTS, TO HILL POWDER COMPANY, OF BOSTON, MASSACHUSETTS, A CORPORATION OF MASSACHUSETTS.

POWDER-MEASURING APPARATUS.

1,185,505.           Specification of Letters Patent.      Patented May 30, 1916.

Application filed December 12, 1907, Serial No. 406,199. Renewed April 10, 1914. Serial No. 831,054.

*To all whom it may concern:*

Be it known that I, WILFORD A. HILL, of Waltham, in the county of Middlesex and State of Massachusetts, have invented certain new and useful Improvements in Powder-Measuring Apparatus, of which the following is a specification.

This invention relates to devices and apparatus for measuring out and segregating from a mass of medicinal or other powders the exact amount necessary to furnish the desired dose or charge. It is designed principally to be used in connection with machines which subsequently wrap up the charges in folded papers, and is also applicable in cases where the charges are simply delivered to papers laid ready to receive them, which are afterward folded by hand.

The main object of the invention is to render possible the accurate measuring out of a dose or charge by providing means for completely filling the chamber of the measuring device, and by causing all of the powder in such chamber to be positively ejected.

A subsidiary object is to provide a stirrer for breaking up lumps of powder and arrange an operating device for such stirrer with provisions for clearing out powder which may work in between the bearing surfaces and eliminate liability of sticking.

The subject-matter of the present invention is the measuring and delivering apparatus illustrated and described in my pending application for powder-folding machine, filed June 11, 1907, Serial No. 378,547, this application showing, however, in addition to the subject-matter divided from the prior case, other modes of employing the invention.

Figure 1:
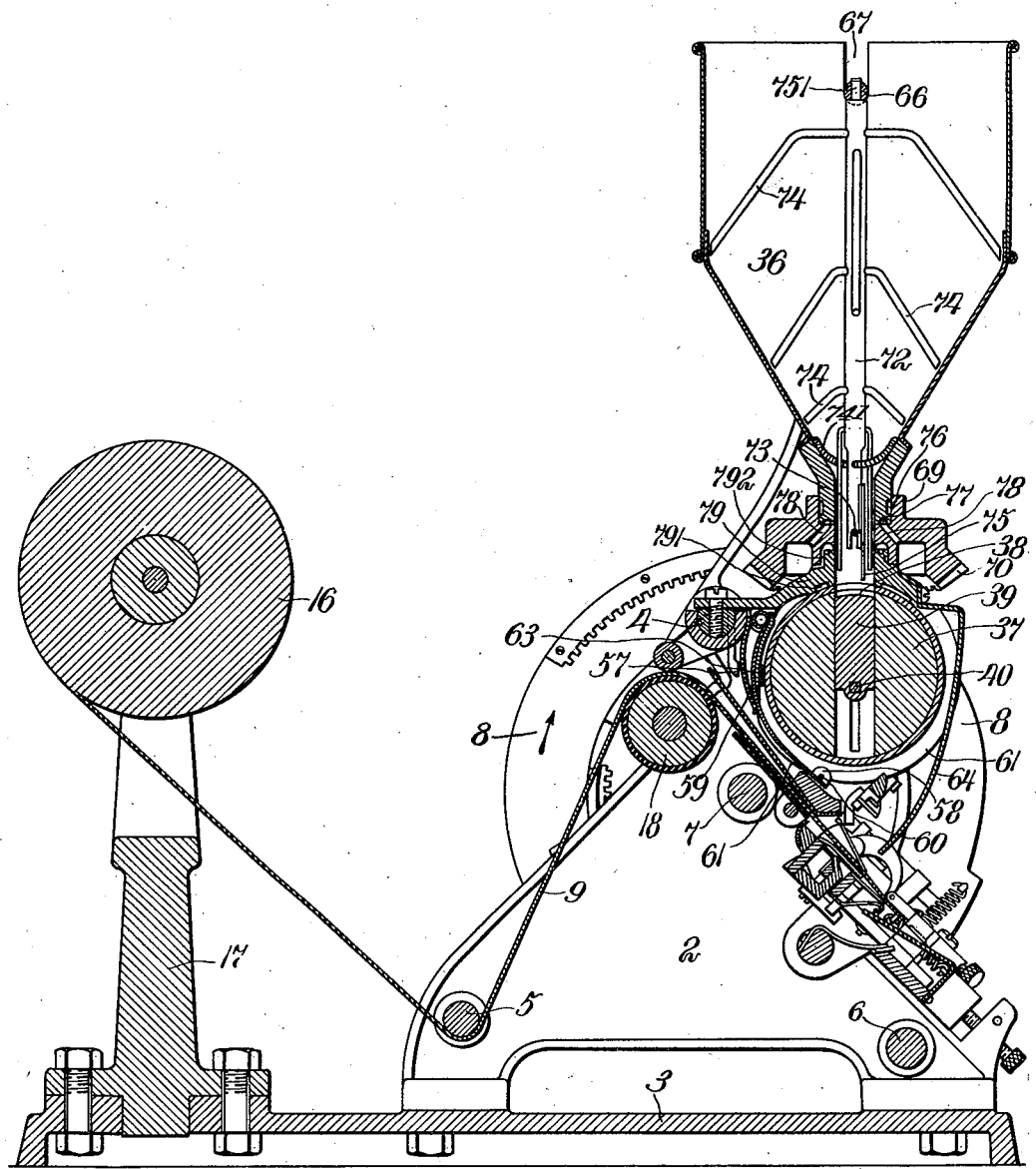
Figure 2:
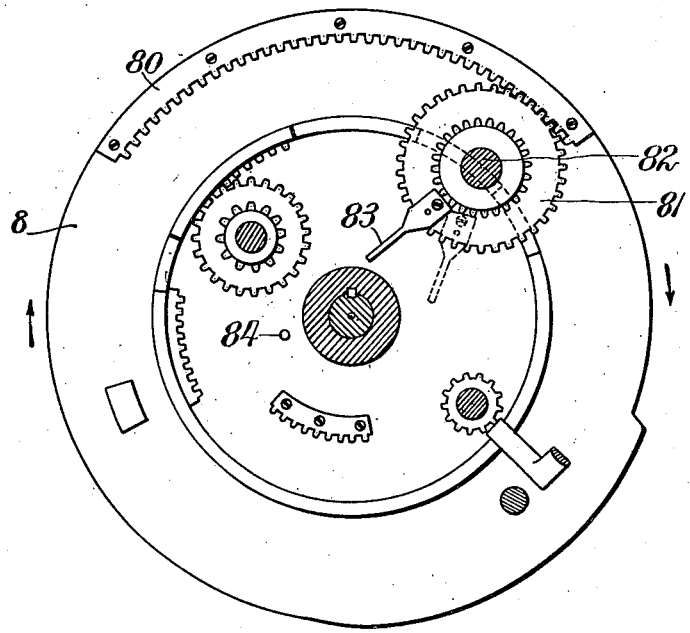
Figure 3:
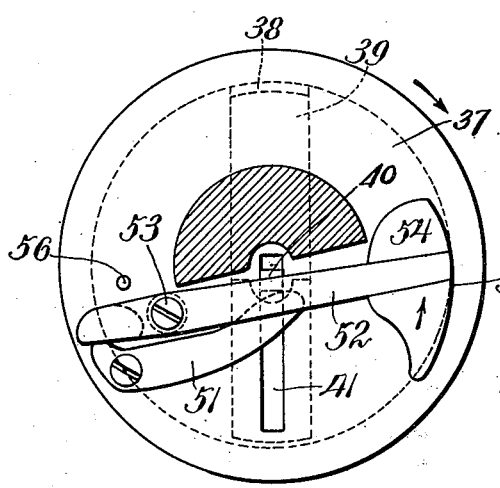
Figure 4:
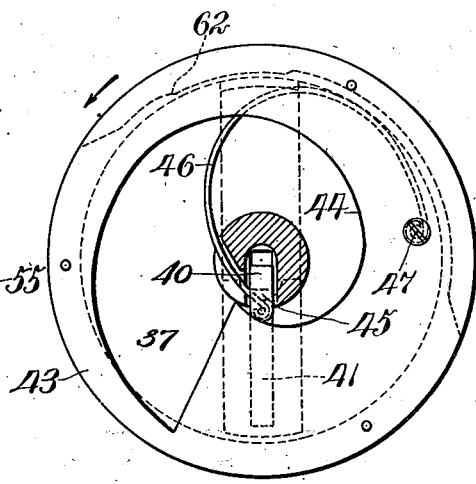
Figure 5:
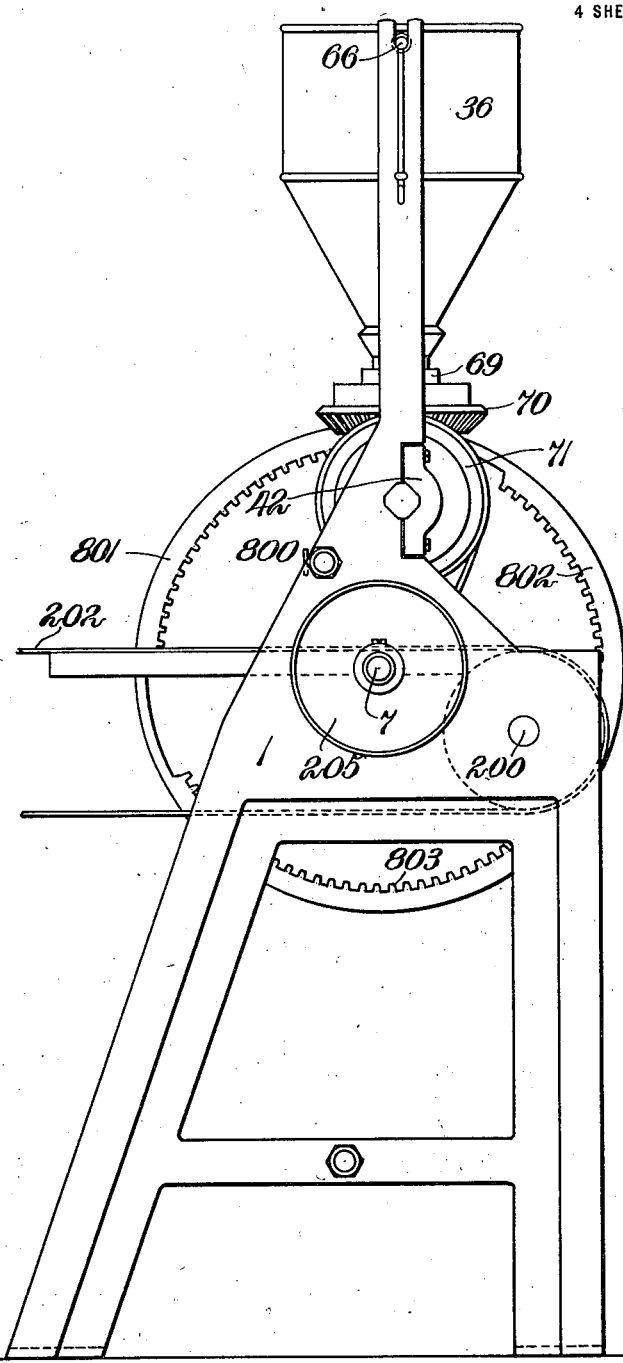

Of the accompanying drawings,—Figure 1 represents a vertical cross-section of a powder-measuring apparatus embodying my invention, as applied to a machine for automatically folding the charges of powder in wrappers. Fig. 2 represents an elevation of the driving disk by which the rotary measurer is operated. Figs. 3 and 4 represent sectional elevations of opposite sides of the powder-measuring device, Fig. 4 showing the means by which the size of the dose is governed and Fig. 3 showing the means for discharging the powder. Fig. 5 represents a side elevation of a machine in which the measuring apparatus is installed so as to deliver powders upon papers which are carried by a traveling conveyer to a distant point before being folded. Fig. 6 represents a front elevation of this machine. Fig. 7 represents an elevation of the driving disk therein employed, the same having provisions for causing a number of actuations of the measurer during one revolution of the disk. Fig. 8 represents the apparatus arranged for subdividing a given quantity of powder into equal parts.

The same reference characters indicate the same parts in all the figures.

In the embodiment of the invention shown in Fig. 1, the measuring apparatus is applied to a machine having folding instrumentalities, and is supported by a frame which consists of the side members 1 and 2 and the base 3. The side members are connected together by transverse bars 4, 5 and 6, and a main shaft 7 extends parallel to these bars and is journaled in the side members. On one end of the shaft is an operating disk 8 which actuates the measuring device and is itself rotated by the main shaft from any suitable source of power. The powder charges are delivered upon papers which are cut from a strip 9 which is delivered from the roll 16 supported by bracket 17 rising from the base 3. The strip is led over a feed-roll 18 to folding instrumentalities which are located directly beneath the discharging point of the measurer and hold the paper in position to receive the charge. The powder is contained in a hopper 36 from which it is delivered to a rotary measurer and conveyer 37 which has a cavity or chamber 38 to receive the powder. Rotation of the measurer carries the cavity into an inverted position and dumps the charge of powder therein upon the paper beneath. The measurer or carrier is a cylinder located directly beneath the outlet of the hopper and provided with a central diametrical cavity in which is contained slidingly a plunger 39. Through the latter near one end passes a shaft or bar 40 of which the ends pass through slots 41 in the end faces of the measurer. The latter has hubs which are rotatably mounted in bearings 42 on the side members of the frame and on one of the hubs is mounted (in a manner, presently described, which permits it to be rotatably adjusted) a plate 43 which has an internal spiral cam surface 44, shown in Fig. 4. Against this surface bears a projection 45 carried on one end of the bar 40, being held against the same by a spring 46, of which one end is connected to the projection 45 and the other end to a stud 47 on the measurer. The tendency of the spring is to force the plunger inward from the mouth of the powder-receiving cavity, so as to deepen the cavity, such motion being opposed by the cam surface 44. When the cam is turned, the spiral surface is caused to advance or recede relatively to the bar 40, thus advancing the plunger 39 or allowing it to be retracted. It will be evident, therefore, that the rotary adjustment of the cam determines the extent of recession of the plunger, and thereby the powder-receiving volume of the cavity. The limits of the cam are such that it may bring the end of the plunger flush with the cylindrical surface of the measurer, or to retract it almost to the axis of the measurer, and the full volume of the cavity is great enough to accommodate the largest powder ordinarily put up. Therefore, by suitably positioning the plunger, the cavity may be adjusted in volume so as to measure out doses of all sizes between the smallest and the greatest ever required. From this it will be seen that the end of the plunger serves as the movable bottom of the measuring chamber by which, not only may the size thereof be graduated, but also the charge may be expelled. Adjustment of the cam is made by means of a knurled thumb-nut 48 upon the hub of the disk 49 to which the cam plate 43 is secured, and the adjustment is made permanent by a lock-nut 50 screwed upon the hub of the measuring cylinder 37. These parts are illustrated in Fig. 6, showing an embodiment of the invention, which, so far as the measuring devices are concerned, is identical with that shown in Fig. 1. On the opposite side of the measuring cylinder is pivoted a lever 51, the long arm of which bears against the end of the bar 40, while the short arm is engaged by the arm of a second lever 52 pivoted to the measuring cylinder at 53, and having a head 54 with a long, external, approximately cylindrical surface 55. When the lever is turned in the direction of the arrow on the head 54, the long arm of lever 51 is caused to press bar 40 inward, and thereby to project the outer end of plunger 39 until its outer end becomes flush with the surface of the cylinder. A pin 56 is provided to arrest the lever 52 and prevent its head being carried too far beyond the periphery of the measurer by centrifugal force.

Beside the end of the measurer which carries lever 52 is an arm 57 secured to the cross bar 4 of the fixed frame and projecting downward. This arm is rigid and is located in the path of the head 54 so as to be struck thereby upon every revolution of the measurer. As the latter rotates in the direction of the external arrow in Fig. 3, it carries the end of head 54 against the projection 57, whereby the head is arrested and caused to stand still while the measurer continues to turn, with the same effect as though the measurer were held stationary and the head caused to turn in the direction of the arrow thereon. This effect is to cause projection of the plunger and forces the powder from the cavity when the latter is inverted, as will be understood from a comparison of Figs. 1 and 3. The edges of the plunger scrape the powder from the sides of the cavity, thus cleaning the latter and expelling all the powder so as to deliver an accurate dose. The extended surface 55 of the head continuing in contact with the arm 57, holds the plunger projected until it has passed by a wiper 58 (Fig. 1). This wiper is urged by a spring arm 59 toward the measurer and is normally held away from the surface of the latter by a pin 60 carried by the wiper and bearing against the rim 61 of the measurer. This rim, however, has a cam-like depression 62 adjacent the cavity (see Fig. 4) which allows the wiper to move into contact with and clean the end of plunger 39 when the latter is inverted and just after the powder has been discharged. A second wiper 63 is held continuously against the surface of the measurer by a spring leaf to which it is fastened, and keeps the cylinder clean. A shield 64 is provided for guiding the powder to the paper preventing it being scattered.

The hopper 36 which contains the powder is held in place by springs 65 connected to the side frames, and a cross bar 66 passing through diametrically opposite notches 67 in the hopper and likewise connected to the frames by springs 68. The lower end is funnel-shaped and projects into a recess in the hub 69 of a gear 70. The latter meshes with a complemental gear 71 connected with the measuring device so that every time the latter rotates, the gear 70 and a stirrer 72 are rotated also to stir the powder and allow it to fall freely into the measurer.

The stirrer consists of a central bar which engages a pin 73 extending across the bore of gear 70 and having arms 74 and a spade 75 for respectively breaking up lumps and cakes of powder and dislodging the powder packed in the passage. There are also flexible arms 741 which project from the central bar and rest on the lower slopes of the conical hopper. These arms serve to stir up the powder at the bottom of the hopper and prevent it from arching over the lower end of the bar and those members which extend vertically into the passage. They are shown as being composed of sections of coiled spring wire, but they may be anything else that is flexible and projects from the bar so as to scrape or lift the powder from contact with the hopper walls. The upper end of the stirrer has a projecting pin 751 journaled in the cross bar 66.

It is practically impossible to prevent the powder working between the bearing surfaces of the gear 70 and accordingly I make provisions for permitting escape of any powder which may work between these surfaces so that it may not cause the device to stick. Such provisions consist of annular grooves 76 and 77 in the exterior and end, respectively, of the hopper outlet, the escape passages 78 through the gear, and radial grooves in the end of the hopper outlet crossing the groove 77. The annular grooves provide clear spaces to receive the powder, while the radial grooves cut it free from the bearing surfaces and feed it into the passages 78. The gear 70 rotates on a stationary support or saddle 79 detachably secured by a screw to the cross-bar 4, on which it has a bearing, and between the adjacent surfaces of the gear and support are similar annular and radial grooves for cutting away and receiving the excess powder. There is an outlet 792 at one side of the bearing for escape of the powder scraped up by the edges of the grooves. I have found that without such grooves the powder, which is certain to work into the spaces between the parts, will in a short time pack so tightly that the gear can not be turned, at least without great difficulty. For a similar purpose the under side of the saddle is cut away at 791 to provide a clearance surrounding a circular lip at the under rim of the outlet passage. The lip cuts the powder from the surface of the measuring cylinder, while at the same time the clearance permits escape of powder which may work through, and prevents the measurer sticking to the saddle.

One of the principal features of the present invention is a means by which the cavity is completely filled at each charging operation. I have found that when the measuring device is brought to rest with its cavity exactly in line with the discharge outlet of the hopper, it does not become fully filled but there is usually a space left near the front side of the cavity which does not receive any powder. Accordingly in the present machine I cause the measurer after discharging one supply, to be carried somewhat farther than directly in line with the hopper outlet, so that only a portion of the cavity is in line therewith. Thereupon after this portion has been filled, I retract the measurer slightly so as to bring the opposite side of the cavity under the hopper outlet. Thereby all parts of the measuring cavity are completely filled. The means for giving these motions to the measurer are illustrated in Fig. 2. As here shown, the right-hand disk 8 has an internal gear segment 80 which is adapted to mesh during part of the rotation of the disk with a pinion 81 on the shaft or hub 82 of the measuring cylinder. The pinion 81 has a finger 83 secured to it, which at certain times, lies in the path of a pin 84 fixed upon the disk. During each revolution of the disk, the segment 80 comes into contact with the gear 81 and gives it slightly more than a complete revolution, starting it from the position indicated by dotted lines in Fig. 2 and leaving it in the position indicated by full lines. In this position the cavity 38 has been carried slightly beyond and out of register with the discharge outlet of the hopper. Immediately after the gear segment has passed out of mesh with the pinion, however, the pin 84 strikes finger 83 and moves the latter back into the dotted-line position, retracting the measuring cavity so that its axis is on the other side of the center of the hopper outlet. The next rotation of the disk carries the measuring cylinder completely around, discharging the contents and leaving it in the first position again. Fig. 1 shows the parts in an intermediate position just after the measurer has been started to carry a supply and dump it on the paper.

In Fig. 1, as has already been stated, the measuring apparatus is applied to a completely automatic machine for folding the powders in paper wrappers. In Figs. 5 and 6, however, is shown the application of the apparatus to a simpler type of machine. In this machine there is provided in addition to the measuring mechanism, a shaft 200 which is contained in bearings in the side frames 1 and 2 and supports between said frames a pulley 201. About this pulley passes a conveyer belt 202, the upper stretch of which passes directly beneath the discharging point of the measurer. Paper wrappers to contain the powders are laid upon this conveyer by an attendant and placed so as to lie beneath the measurer at the moment of discharge from the latter. The papers thus loaded with powders are carried by the conveyer to a remote point, where they are removed and folded up by other attendants. The shaft 200 and conveyer belt are driven from the main shaft 7 through a pinion 203 on the latter, which meshes with a pinion 204 mounted on the shaft 200. The power for the machine as a whole is furnished by a pulley 205 on the main shaft 7 over which is adapted to be passed a belt from a motor or counter-shaft.

The disk 800 by which the measuring device is operated differs from that previously described in providing for a plurality of actuations during one rotation. Accordingly, it is provided with a number of segments 801, 802 and 803, respectively, each of which is adapted to mesh with the pinion 81.

There is a corresponding number of pins 841, 842 and 843, respectively, which engage with the projection 83 immediately after the segments have passed out of mesh with the pinion. This modification permits a more rapid sequence of operations of the measurer and is rendered possible by the fact that in the modified form of machine there is no necessity of delaying the measurer so as to permit folding of the powder papers between actuations thereof. It is within the contemplation of my invention to drive the modified machine by hand instead of by power, and for this purpose I provide a crank pin 206 on the outer surface of the disk 800.

The embodiment of the invention as described in the foregoing has concerned itself with removing quantities of powder of a given quantity from a mass without preserving any special relation between the whole amount of powder in the container and that removed at each operation of the measurer. It is, however, desirable in prescription work to divide a given quantity of powder into a definite number of equal doses or charges. To this end the hopper is provided with a scale 361 by which the volume of powder within the hopper may be determined, while the cam plate 43 has on its periphery graduation marks by which the plunger 39 may be set so that the volume of the measuring chamber is an even fractional part of the volume occupied by the powder in the hopper. When the zero mark of the graduations on the disk 43 is opposite an index on a stationary part of the machine or on the parts 49 or 61, the end of the plunger is flush with the periphery of the conveyer so that the measuring chamber does not exist. The scale is such that any fractional part of any of the numbers on the indicator 361 can be placed opposite the relatively fixed index mark. The relation of the volume of powder in the hopper to the scale 361 is made evident either by having the hopper of glass or other transparent material, or by engraving or etching the graduation marks on or beside a longitudinal window 362 in an otherwise opaque hopper. When the system illustrated in Fig. 8, is used, it is preferable that the hopper should be of approximately equal cross-section throughout its height, so that the markings of the scale may be evenly spaced. This, however, is not essential, for a scale properly graduated to allow for the variation in cross-section in the form of hopper shown in the other views, may be employed in connection with the latter, as is shown in Fig. 6.

The apparatus referred to above as being shown in Fig. 8, has the rotary conveyer 37 with the measuring cavity, plunger, and adjusting cam as previously described. It differs from the other embodiments of the invention in having as the stirrer a loop of wire, or tongue, 720 which extends up into the bottom of the hopper and has an external arm 721 by which it is oscillated. This arm is engaged by a stud 700 projecting from the side of the conveyer, and swung back and forth.

I claim:

1. An apparatus for measuring charges of powder, comprising in combination a container for powder having an outlet, a measuring conveyer arranged to travel close to said container outlet, normally covering and closing the same and having a cavity or chamber to receive and measure the charges of powder when in line with the container outlet, and means for driving said conveyer to carry charges from the powder container and deliver them at the required point, said driving means being adapted to place the conveyer in different stationary positions, in which first one side and then the other of the measuring cavity partially uncovers the outlet, the cavity being at the same time only partially exposed to the outlet, whereby the cavity is caused to become completely filled.

2. A measuring device for segregating from a mass and delivering definite quantities of powder to be wrapped, comprising, in combination with a container adapted to hold a number of charges of powder and having an outlet, a cylinder having a cavity opening inward from its periphery and arranged to rotate close to the container outlet, the limits of rotation of the cylinder being sufficiently wide to permit first one and then the opposite side of the cavity to be partially exposed beneath the outlet and to invert the cavity for dumping the charge, and driving means for automatically turning the cylinder first in one, and then in the opposite direction, for the purpose specified.

3. A measuring device for segregating from a mass and delivering definite quantities of powder to be wrapped, comprising, in combination with a container adapted to hold a number of charges of powder and having an outlet, a rotary conveyer having a surface normally closing such outlet and provided with a measuring chamber located so as to be movable under the outlet, and means for moving the conveyer and its cavity back and forth, said means having provisions for causing the conveyer to come to rest, first when the cavity only partially uncovers the outlet and one side thereof is exposed to the powder in the outlet, and next when the opposite side of the cavity partially uncovers the outlet and is exposed to the powder, whereby the cavity becomes fully filled, and for then inverting the conveyer to dump its charge.

4. A measuring device for segregating from a mass and delivering definite quantities of powder to be wrapped, comprising, in combination with a container adapted to hold a number of charges of powder and having an outlet, a rotary conveyer having a surface of greater extent than, and normally closing, such outlet and provided with a measuring chamber located so as to be movable under the outlet, and means for rotating said conveyer, said means having provisions for causing the reversal of the conveyer, to carry its cavity back and forth under the outlet a plurality of times before it is carried around to discharge its contents, pushing first one side and then the other of the cavity into and against the mass of powder, whereby all parts of the cavity are caused to become fully filled.

5. An apparatus for measuring charges of powder, comprising in combination a container for powder having an outlet, a rotary measuring conveyer arranged with its periphery close to the container outlet, normally covering the same, and having a receiving cavity, a pinion fixed to said conveyer, a rotary driver having a series of tooth projections adapted to engage the pinion on one side of its axis and turn the same and the conveyer through more than a complete rotation, and a second projection on the driver adapted to reverse the conveyer through a relatively small angle, said projections being arranged to leave the conveyer at rest alternately with the opposite edges of its cavity partially uncovering the outlet.

6. An apparatus for measuring charges of powder, comprising in combination a container for powder having an outlet, a rotary measuring conveyer arranged with its periphery close to the container outlet, normally covering the same, and having a receiving cavity, a pinion fixed to said conveyer, a finger carried by said pinion and projecting beyond the periphery thereof, a rotary driver having a series of tooth projections adapted to engage the pinion on one side of its axis and turn the same and the conveyer through more than a complete rotation, and a second projection on the driver adapted to strike said finger and turn the conveyer reversely through a relatively small angle, said driving projections being located and arranged so as to leave the conveyer at rest with first one, and then the opposite, edge of the cavity partially uncovering the outlet, whereby complete filling of the cavity is rendered possible.

7. An apparatus for separating individual charges of powder from a mass comprising, in combination with a container adapted to contain a mass of powder and having an outlet therefor, a conveyer mounted below and in close proximity to said outlet, having a measuring cavity and being rotatable to invert the cavity, a movable bottom for said cavity, a stationary stop, and positive actuating means carried by said conveyer and arranged to make contact with said stop for causing advance of said movable bottom to the mouth of the cavity to expel the charge therein.

8. An apparatus for measuring charges of powder, comprising in combination a powder container, a conveyer having a cavity for receiving powder and delivering the same to be wrapped in a folded paper, a plunger forming the bottom of the cavity, an abutment adjustable to vary the position of the plunger in the cavity, and thereby the volume of the latter, and positive means for projecting the plunger to discharge the contents of the cavity upon arrival of the latter at the point of delivery.

9. An apparatus for measuring charges of powder, comprising in combination a powder container, a conveyer having a cavity for receiving powder and delivering the same to be wrapped in folded paper, a plunger forming the bottom of the cavity, a lever mounted on the conveyer engaged with said plunger, a stop on the machine, and means carried by the conveyer arranged to strike said stop and operate said lever so as to cause the latter to project the plunger and discharge the contents of the cavity on arrival of the latter at the point of delivery.

10. An apparatus for separating individual charges of powder from a mass, comprising in combination a powder container, a conveyer having a cavity for receiving powder and delivering the same to be wrapped in a folded paper, a plunger forming the bottom of the cavity, a combination of levers mounted on the conveyer engaging said plunger, and a stationary stop on the machine adapted to engage and arrest one of said levers while the conveyer continues its movement, whereby the plunger is forced outward toward the mouth of the cavity to eject the contents of the latter.

11. An apparatus for separating individual charges of powder from a mass, comprising in combination a powder container having an outlet, a rotary conveyer mounted with its periphery close to said outlet and having a cavity to receive powder therefrom, a plunger in said cavity forming the bottom thereof, a projection from said plunger, and a disk revolubly mounted beside said plunger having a cam surface surrounding said projection, said disk serving to adjust the distance of the plunger from the periphery of the disk and thereby regulate the volume of the cavity.

12. An apparatus for separating individual charges of powder from a mass, comprising in combination a powder container having an outlet, a rotary conveyer mounted with its periphery close to said outlet and having a cavity to receive powder therefrom, a plunger in said cavity forming the bottom thereof, a projection extending from said plunger through the conveyer, a disk revolubly mounted on the side of the conveyer beside said plunger having a cam surface engaged by said projection, said disk serving to adjust the distance of the plunger from the periphery of the disk and thereby regulate the volume of the cavity, and having graduations on its outer periphery whereby to measure adjustments thereof and of the plunger.

13. An apparatus for separating individual charges of powder from a mass, comprising in combination a powder container having an outlet, a rotary conveyer mounted with its periphery close to said outlet and having a cavity to receive powder therefrom, a plunger in said cavity forming the bottom thereof, a projection from said plunger, and a disk revolubly mounted beside said plunger having an internal spiral cam surface engaged by said projection, said disk serving to adjust the distance of the plunger from the periphery of the disk and thereby regulate the volume of the cavity.

14. An apparatus for separating individual charges of powder from a mass, comprising in combination a powder container having an outlet, a rotary conveyer mounted with its periphery close to said outlet and having a cavity to receive powder therefrom, a slot formed in said conveyer beside the plunger, a plunger in said cavity forming the bottom thereof, a transverse bar passing through the plunger and guided in said slot, and a disk revolubly mounted beside said plunger having a cam surface against which one end of said bar bears.

15. An apparatus for separating individual charges of powder from a mass, comprising in combination a powder container having an outlet, a rotary conveyer mounted with its periphery close to said outlet and having a cavity to receive powder therefrom, a slot formed in said conveyer or beside the plunger, a plunger in said cavity forming the bottom thereof, a transverse bar passing through the plunger and guided in said slot, and a plurality of levers pivoted to the side of the conveyer, of which one bears on said bar and a second engages the first, whereby movement of the second is enabled to project the plunger so as to discharge the contents of the cavity.

16. An apparatus for separating individual charges of powder from a mass comprising, in combination with a container adapted to contain a mass of powder and having an outlet therefor, a conveyer mounted below and in close proximity to said outlet, having a measuring cavity and being rotatable to invert the cavity, a movable bottom for said cavity movable toward the mouth of the cavity to expel the contents thereof during the movement of the conveyer wherein the cavity is inverted, and a wiper adjacent to the periphery of the conveyer for removing particles of powder adhering thereto and to the movable bottom surface.

17. An apparatus for separating individual charges of powder from a mass, comprising in combination a powder container, a rotary conveyer for receiving powder from said container and delivering the same, a plunger located in said cavity to form an adjustable bottom therefor, means for projecting the plunger to discharge the powder at the point of delivery, and a wiper adjacent the periphery of the conveyer at the under side thereof for removing particles of powder adhering thereto.

18. An apparatus for separating individual charges of powder from a mass, comprising in combination a powder container, a rotary conveyer for receiving powder from said container and delivering the same, a plunger located in said cavity to form an adjustable bottom therefor, means for projecting the plunger to discharge the powder at the point of delivery, a wiper adjacent the periphery of the conveyer for removing particles of powder adhering thereto, and a cam movable with the conveyer for normally holding said wiper out of contact with the conveyer, arranged to render the wiper operative when the cavity and plunger end arrive adjacent thereto.

19. A powder-measuring apparatus comprising a hopper containing a quantity of powder and having a substantially vertical elongated outlet passage, a movable conveyer located in position to stop said outlet and having a measuring chamber movable under and past the outlet, and stirring means extending into said outlet passage longitudinally thereof and being rotatable about the axis of the passage, being also eccentric to the axis about which it rotates.

20. A powder-measuring apparatus comprising a hopper adapted to contain a quantity of powder and having at its lower end a substantially vertical outlet passage, a gear mounted to rotate about said passage, a rotary conveyer arranged beneath the discharge orifice of said passage having a measuring cavity arranged to be brought into registry with such orifice and to be carried past the same, a gear connected with the conveyer and meshing with the first-named gear for rotating the latter when the conveyer is rotated, and a stirring device lying in such passage and arranged to rotate about an axis extending in the direction of the length of the passage, and being connected with the first-named gear for rotation thereby.

21. An apparatus for separating individual charges of powder from a mass, comprising in combination a powder-containing hopper, a device within the hopper for stirring the powder, mechanism for producing relative motion between the hopper and stirrer, including a stationary bearing, a driver rotatably mounted upon said stationary bearing, the latter and driver having a passage through them for outflow of powder from the hopper, and having grooves and scraping edges to receive and remove from between the bearing surfaces the powder which may pass from the outlet passage between such surfaces.

22. An apparatus for separating individual charges of powder from a mass, comprising in combination a powder-containing hopper, a device within the hopper for stirring the powder, mechanism for producing relative motion between the hopper and stirrer, including a stationary bearing, a gear mounted to rotate upon said stationary bearing and about the end of the hopper, said gear and bearing having a passage through them for outflow of the powder and having grooves, recesses and scraping edges in their adjacent surfaces, the hopper also having grooves and the gear having passages leading from its bearing on the hopper to points outside the stationary bearing.

23. An apparatus for separating individual charges of powder from a mass, comprising in combination a powder container, a rotary conveyer for receiving powder from said container and delivering the same, a plunger located in said cavity to form an adjustable bottom therefor, means for projecting the plunger to discharge the powder at the point of delivery, said plunger having sharp cutting edges at the intersection of its end and sides to scrape off particles of powder adhering to the walls of the conveyer cavity, and a wiper adjacent the periphery of the conveyer adapted to rub the end of the plunger for removing particles of powder adhering thereto.

24. A powder-measuring apparatus, consisting of a hopper containing a quantity of powder and having an outlet at its lowest point, a conveyer arranged below said outlet so as to receive and remove charges of powder therefrom, and means for stirring up the powder to prevent bridging of the same across the outlet, said means including a rotary shank arranged to turn about an axis in the center of the outlet, and arms extending therefrom and bearing upon the bottom surfaces of the hopper contiguous to the outlet.

25. An apparatus for measuring charges of powder and the like comprising, in combination with a container having an outlet, a measuring conveyer having a cavity, said conveyer being so movable as to shift such cavity in a path which crosses the said outlet and invert the cavity for dumping, and mechanism for so moving said conveyer, said mechanism having means for producing a limited reversal of the movement of the conveyer while the cavity is partly in registry with the outlet.

26. An apparatus for measuring charges of powder and the like comprising, in combination with a container having an outlet, a measuring conveyer having a cavity rotatably adjacent to such outlet in such position that the cavity may be brought into registry with said outlet and may be thus brought into inverted position to dump its contents, and mechanism for driving said conveyer rotatably, said mechanism including means for effecting reversal and limited backward movement of the conveyer while the same is in registry with the outlet.

27. An apparatus for measuring charges of powder and the like comprising, in combination with a container having an outlet, a rotary measuring conveyer arranged closely adjacent to said outlet and having a cavity so located that it may be brought into registry with said outlet by movement of the conveyer, a rotary driver, and a rotary driven element connected with said conveyer, said driver having means for engaging the driven element and rotating the same continuously through a wide arc in one direction, and also having means for engaging said driven element and rotating the same through a short arc in the opposite direction.

28. An apparatus of the character described, comprising in combination, a container having a downwardly opening outlet, a measuring conveyer provided with a cavity and rotatable adjacent to said outlet so as to receive in its cavity powder issuing from said outlet, and to dump the powder, and a traveling wrapper conveyer arranged beneath the measuring conveyer and adapted to place wrappers beneath the dumping position of said cavity.

29. An apparatus of the character described, comprising in combination, a container having a downwardly opening outlet, a measuring conveyer provided with a cavity and rotatable adjacent to said outlet so as to receive in its cavity powder issuing from said outlet, and to dump the powder, and an endless belt conveyer arranged and operated to travel beneath the dumping position of said cavity and adapted to support and convey powder wrappers.

30. A measuring apparatus comprising in combination a container having an outlet, a measuring conveyer having a cavity adapted to be placed in registry with said outlet to receive powder therefrom, said cavity being adjustable in volume, means for adjusting the volume of said cavity, a measuring indicator arranged to show the quantity of powder in the container, and graduations connected with the cavity adjusting means and having characters indicating fractional parts of the volume in the container.

In testimony whereof I have affixed my signature, in presence of two witnesses.

WILFORD A. HILL.

Witnesses:
RICH'D H. JONES,
JOHN C. MILLER.